Figure 1:
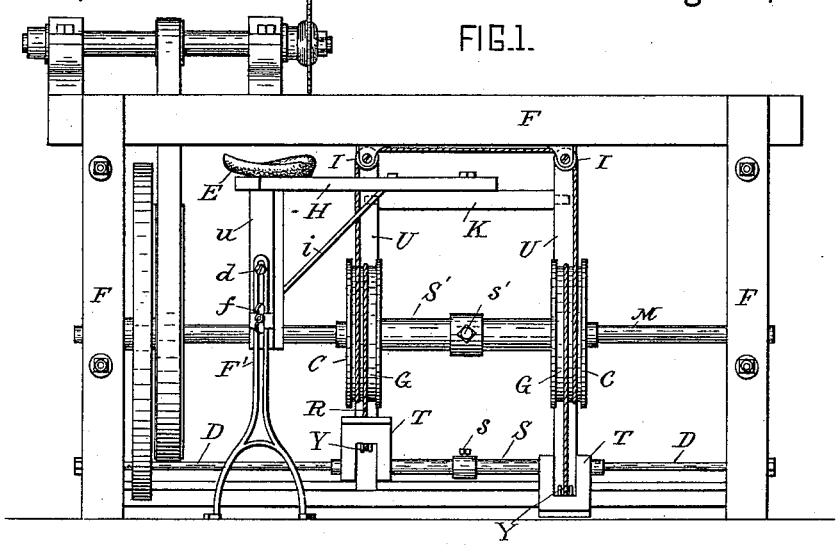

(No Model.) 2 Sheets—Sheet 1.

W. R. HUNTER.
MECHANICAL MOTOR.

No. 434,447. Patented Aug. 19, 1890.

Witnesses
J. G. Lepper.
N. T. Collamer

Wm. R. Hunter Inventor
By his Attorneys,
C. A. Snow & Co.

(No Model.) 2 Sheets—Sheet 2.

W. R. HUNTER.
MECHANICAL MOTOR.

No. 434,447. Patented Aug. 19, 1890.

Witnesses
J. G. Lepper.
N. J. Collamer.

Wm. R. Hunter Inventor

By his Attorneys,
C. A. Snow & Co.

UNITED STATES PATENT OFFICE.

WILLIAM R. HUNTER, OF AFTON, IOWA.

MECHANICAL MOTOR.

SPECIFICATION forming part of Letters Patent No. 434,447, dated August 19, 1890.

Application filed May 2, 1890. Serial No. 350,335. (No model.)

*To all whom it may concern:*

Be it known that I, WILLIAM R. HUNTER, a citizen of the United States, residing at Afton, in the county of Union and State of Iowa, have invented a new and useful Mechanical Motor, of which the following is a specification.

This invention relates to mechanical motors, more especially to those adapted to be operated by foot-power; and the object of the present invention is to improve devices of this character heretofore existing.

To this end the invention consists of a frame-work carrying a main shaft, upon which is mounted a fly-wheel and a band-wheel carrying a belt adapted to convey power to a distant point, two friction-clutches upon said shaft, two levers from which lead cords passing over the peripheries of said clutches and thence over an idle-wheel and connected to each other, and other specific details of construction and preferred details, all as hereinafter more fully described, and illustrated in the drawings, in which—

Figure 2:
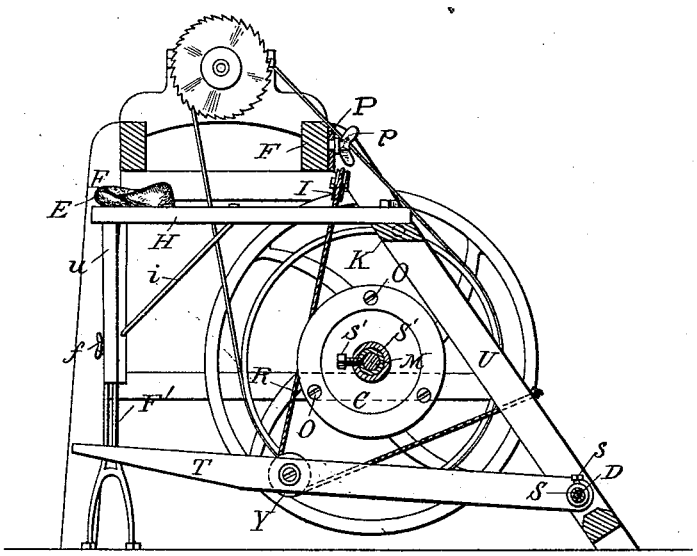
Figure 3:
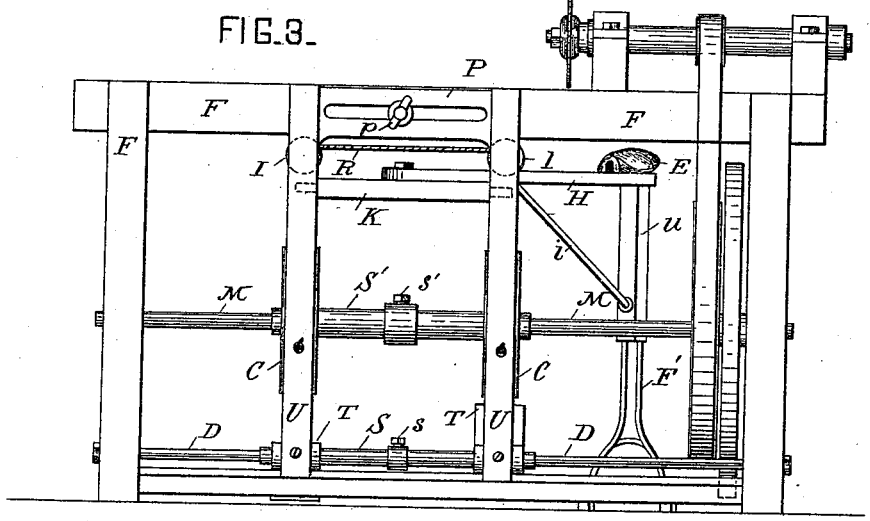
Figure 4:
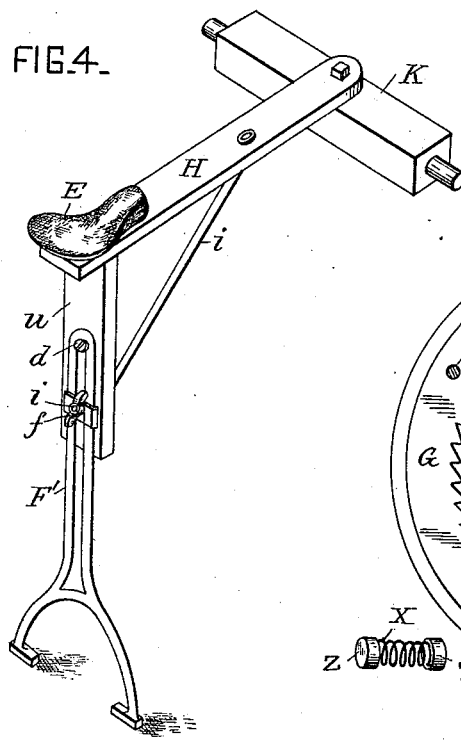
Figure 5:
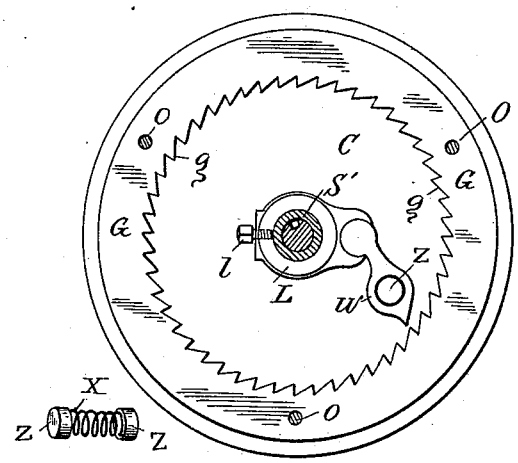

Figure 1 is a front elevation of the machine complete. Fig. 2 is a transverse section through the main shaft between the two clutches, looking toward the fly-wheel. Fig. 3 is a rear elevation. Fig. 4 is a detail in perspective of the seat. Fig. 5 is an interior view of one of the friction-clutches.

Referring to the said drawings, the letter F designates the frame-work of this device, which may be of wood or any other suitable material which will answer the purpose, and M is the main shaft journaled therein longitudinally and carrying a fly-wheel and band-pulley, as shown. On the top of this frame-work is supported a lathe, circular saw, jig-saw, or other small mechanism capable of being driven by a motor of this character.

T are treadles pivotally connected to the rear of the frame-work, and R is a rope leading from one of said treadles and given several coils around a clutch C, thence over an idle-pulley I in the upright, thence around another clutch C (both of said clutches being mounted on the main shaft) to the other treadle T. By this arrangement of devices when the treadles are alternately depressed a continued rotary motion will be given the main shaft in one direction, which movement can be transmitted by suitable belting to the machinery carried upon the head of the frame-work, all as is old and well known in this class of motors.

Coming now to the present invention, D is a rod connecting the end bars of the frame-work at the rear thereof, and S is a sleeve sliding longitudinally upon said rod and adapted to be fastened at any desired point thereto by a set-screw s, as shown.

U are uprights rigidly secured at their lower ends upon said sleeve and connected at their upper ends by a slotted plate P, the latter being removably locked or connected to the head of the frame-work by a thumb-nut p, as shown. The rear ends of the treadles are bifurcated and straddle the uprights U, being journaled upon the sleeve S.

K is a block pivoted at its ends between the uprights U, and H is a bar resting upon and pivoted at its rear end to the center of said block. At the front end of this bar is a seat E, beneath which is a short upright u, connected with the bar by an inclined brace i. In the front of this upright is a stud d, which engages a slot in a foot-piece F', and f is a thumb-nut screwed upon the projecting threaded end of the brace i, and adapted to hold the foot-piece clamped against the upright u, so that the same may be lengthened or shortened to raise or lower the seat E. When the seat is so adjusted, the block K turns on its pivotal connection with the uprights U, as will be understood. When the set-screw s is loosened, as well as the thumb-nut p, and the two uprights and treadles are moved longitudinally of the frame-work F it will be understood that the seat E and its support is also moved.

The main shaft M is preferably grooved longitudinally, and a sleeve S' fits upon the shaft and has a set-screw s' taking into said groove, by means of which the sleeve can be adjusted to any desired position upon the shaft, but will be prevented from turning thereon. Upon this sleeve are mounted two clutches, each of which consists of cup-shaped heads C, between which is a ring G, having interior ratchet-teeth g, the heads and the rings being held together by screws or bolts O passing through them near their peripheries. Within the box thus formed a lug L is secured upon the sleeve, as by means of a set-screw l, and this lug has pivotally mounted in it a pawl W, whose tip is adapted to engage the teeth $g$ when it is distended, but to swing out of engagement therewith when it is brought inwardly toward the axis of the lug. Through the pawl is formed a hole transverse to the length of the pawl but parallel with the main shaft, and in this hole is mounted a coiled spring X, having heads Z of Babbitt metal at each end, which are pressed outwardly by the spring against the inner faces of the heads C, for a purpose to appear hereinafter.

The rope R, heretofore referred to, may be connected directly with the treadles, led upwardly, and given several coils around the periphery of each clutch, and then continued farther upwardly over the two idle-pulleys I in the upper ends of the uprights U, or the lower ends of the rope may be passed over pulleys Y, journaled in the slots in the treadles, carried thence upwardly and secured to the uprights U. The former arrangement gives greater power, as when the work is heavy, and the latter arrangement gives greater speed when a rapid rotation of the work is necessary, all as will be clearly understood by a person skilled in the art. The rope passes from each treadle upwardly to and several times around each clutch, above which it passes over the two idle-pulleys I, whereby when one treadle is depressed it automatically elevates the other. As each lever is depressed, the clutch is turned against the pawl W, which engages the teeth $g$ and thereby rotates the main shaft, and as the lever rises the pawl is thrown out of engagement with the teeth, whereby the clutch is permitted to revolve in a direction the opposite of that in which the main shaft is turning.

The shifting of the pawl out of and into engagement with the ratchet-teeth is effected by the friction of the Babbitt-metal heads Z, upon the inner faces of the heads C of the clutches, and it will be understood that when the heads C are turned in the same direction as the main shaft this friction will throw the pawls W outwardly into engagement with the teeth; but when the heads are turned in the opposite direction the friction will throw the pawls inwardly.

A machine constructed as above described will be found useful in a work-shop or in an experimental room where light mechanism is to be driven by foot-power. The two levers constituting the treadle, and with them the seat, may be moved longitudinally of the frame-work to bring the operator to any position in front thereof where he desires to work, and the seat may be raised and lowered to suit various operators or may be turned aside entirely when it is not desired to use it.

What I claim is—

1. In a mechanical motor, the combination, with the frame-work having a rod extending longitudinally thereof at the rear, a sleeve mounted on said rod, and treadles pivoted on said sleeve, of a driving-shaft, a sleeve longitudinally adjustable thereon, clutches turning with said sleeve, and ropes connecting said treadles with said clutches, substantially as described.

2. In a mechanical motor, the combination, with the frame-work having a rod extending longitudinally thereof at the rear, a sleeve mounted on said rod, a set-screw in said sleeve, uprights rising from said sleeve and connected at their upper ends by a slotted plate, a thumb-nut securing said plate adjustably to the head of the frame-work, a seat carried by said upright, and levers pivoted on said sleeve, of a main shaft, clutches thereon movable longitudinally thereof, and ropes connecting said treadles with said clutches, substantially as described.

3. In a mechanical motor, the combination, with the frame-work having a rod extending longitudinally thereof at the rear, a sleeve mounted on said rod, a set-screw in said sleeve, uprights rising from the sleeve and adjustably connected at their upper ends to the head of the frame-work, a block pivoted between said uprights, a bar pivoted to said block and carrying a seat, and a foot-piece supporting said seat, of levers pivoted on said sleeve, a main driving shaft, longitudinally-movable clutches thereon, and ropes connecting said levers with the clutches, substantially as described.

4. In a mechanical motor, the combination, with the main driving-shaft having a longitudinal groove, the sleeve thereon, a set-screw in said sleeve taking into said groove, clutches turning with said sleeve, and ropes running over said clutches, of levers connected to the lower ends of the ropes, and means, substantially as described, for moving the pivotal supports of the levers in unison with the movement of the sleeve on the main shaft, as and for the purpose set forth.

5. The herein-described clutch, the same comprising two cup-shaped heads mounted upon an axle, a ring between them having internal ratchet-teeth, bolts connecting said parts, a lug keyed to said axle, a pawl pivoted to said lug and provided with a hole through its body parallel with the axle, a spring in said hole, and heads at the ends of said spring pressed outwardly against the inner faces of said cup-shaped heads, the whole operating substantially as described.

In testimony that I claim the foregoing as my own I have hereto affixed my signature in presence of two witnesses.

WILLIAM R. HUNTER.

Witnesses:
J. F. SYP,
LORIN SHEPHERD.